US008328930B2

(12) United States Patent
Tauber et al.

(10) Patent No.: US 8,328,930 B2
(45) Date of Patent: Dec. 11, 2012

(54) PIGMENT PREPARATION, METHOD FOR PRODUCING THE SAME AND ITS USE

(75) Inventors: Gerd Tauber, Seligenstadt (DE); Stephan Lüdtke, Gelnhausen (DE); Ralph McIntosh, Hanau (DE); Werner Kalbitz, Rodenbach (DE); Jutta Zimmermann, Alzenau (DE); Alfons Karl, Gründau (DE); Stephanie Frahn, Laufach-Frohnhofen (DE)

(73) Assignee: Evonik Degussa GmbH, Essen (DE)

( * ) Notice: Subject to any disclaimer, the term of this patent is extended or adjusted under 35 U.S.C. 154(b) by 405 days.

(21) Appl. No.: 12/602,959

(22) PCT Filed: May 20, 2008

(86) PCT No.: PCT/EP2008/056194
§ 371 (c)(1),
(2), (4) Date: Dec. 3, 2009

(87) PCT Pub. No.: WO2008/148639
PCT Pub. Date: Dec. 11, 2008

(65) Prior Publication Data
US 2010/0180794 A1 Jul. 22, 2010

(30) Foreign Application Priority Data
Jun. 8, 2007 (DE) .......................... 10 2007 026 551

(51) Int. Cl.
*C04B 14/00* (2006.01)
*C09D 11/00* (2006.01)
*A61K 8/02* (2006.01)
(52) U.S. Cl. ....... 106/400; 106/31.6; 106/31.9; 424/401
(58) Field of Classification Search ................. 106/31.6, 106/31.56, 31.9, 400; 424/401
See application file for complete search history.

(56) References Cited

U.S. PATENT DOCUMENTS

| | | | | |
|---|---|---|---|---|
| 3,656,982 A | * | 4/1972 | Chapman et al. | 106/415 |
| 5,411,833 A | * | 5/1995 | Swidler | 430/108.3 |
| 5,425,993 A | * | 6/1995 | Morancais et al. | 428/402.24 |
| 6,132,736 A | * | 10/2000 | Mellul et al. | 424/401 |
| 6,451,100 B1 | | 9/2002 | Karl et al. | |
| 6,569,231 B1 | | 5/2003 | Mathias et al. | |
| 6,685,769 B1 | | 2/2004 | Karl et al. | |
| 2001/0032569 A1 | * | 10/2001 | Bergemann et al. | 106/472 |
| 2002/0014179 A1 | | 2/2002 | Nickel et al. | |
| 2006/0243165 A1 | | 11/2006 | Luthge et al. | |

FOREIGN PATENT DOCUMENTS

| | | |
|---|---|---|
| DE | 197 48 575 | 5/1999 |
| DE | 10 2004 058 271 | 6/2005 |
| EP | 0 259 130 | 3/1988 |
| EP | 1167461 A2 | 1/2002 |
| FR | 1 233 251 | 10/1960 |
| WO | 2004/046256 | 6/2004 |
| WO | 2005/017047 | 2/2005 |
| WO | 2006/061110 | 6/2006 |
| WO | 2007/039604 | 4/2007 |

OTHER PUBLICATIONS

International Search Report for PCT/EP2008/056194 mailed May 8, 2009 w/ English language translation.
PCT Notification Concerning Transmittal of International Preliminary Report on Patentability (Form PCT/IB/326) received in PCT/EP2008/056194 mailed Dec. 23, 2009.
PCT International Preliminary Report on Patentability (Form PCT/IB/373) received in received in PCT/EP2008/056194 issued Dec. 11, 2009.
PCT Written Opinion of the International Searching Authority (Form/ISA/237) received in PCT/EP2009/056194 mailed Dec. 8, 2009.
PCT Notification of Transmittal of translation of the International preliminary Report on Patentability (Form PCT/IB/338) received in PCT/EP2008/056194 mailed Jan. 21, 2010.
PCT International Preliminary Report on Patentability (Form PCT/IB/373) received in PCT/EP208/056194 issued Jan. 12, 2010.
Translation of PCT Written Opinion of the International Searching Authority (Form PCT/SA/237) received in PCT/EP208/056194 issued Jan. 11, 2010.

* cited by examiner

*Primary Examiner* — Pegah Parvini
(74) *Attorney, Agent, or Firm* — Smith, Gambrell & Russell, LLP (57) ABSTRACT

Pigment preparation containing at least one pigment and at least one compound of the general formula $CH_3-(CH_2)_n-CH_2-O-[(CH_2)_p-O]_m-H$. The pigment preparation can be produced by dispersing and drying.
It can be used for coloration and/or antistaticization in waterborne color and varnish systems, emulsion paints, printing inks, liquid-ink systems and coating systems.

9 Claims, 5 Drawing Sheets

Inventive ink 1

Reference ink 1

Inventive ink 2

Reference ink 2

Inventive ink 3

Reference ink 3

Figure 5

PIGMENT PREPARATION, METHOD FOR PRODUCING THE SAME AND ITS USE

The invention concerns a pigment preparation, a process for producing it and its use.

Powder pigments are used for pigmentation of thermoplastics. The advantage of powder pigments is that they are not dependent on a carrier material. However, this advantage is often achieved at the expense of dispersibility.

To improve dispersibility, the pigments are coated with resin (DE 2540355) or with polymers (U.S. Pat. No. 3,133,893).

Specific drying processes are known from EP 0036520, wherein finely divided pigments and a liquid whose critical temperature is below the decomposition temperature of the pigment is heated under pressure to temperatures above the critical temperature of the liquid and then the pressure is released while the temperature is at all times maintained above the dew line of the liquid.

EP 0282855 discloses pigment preparations which comprise an organic pigment and/or carbon black and a surfactant selected from alkylbenzenesulphonates and specific sulphosuccinic esters and which, if appropriate after wet comminution, are dried from the aqueous medium by spray or freeze drying.

EP 1103173 discloses pigment preparations for colouring seed which comprise a pigment and a polyether polyol.

US 2005090609 discloses pigment granules having an average particle size of 50-5000 μm and a BET surface area of $\leq 15$ $m^2/g$, comprising inter alia 10-40% by weight of at least one nonionic surface-active additive based on polyethers.

Existing pigment preparations have the disadvantage of poor stir-in dispersibility.

It is an object of the present invention to produce a pigment preparation having good stir-in dispersibility in water.

The present invention provides a pigment preparation which is characterized in that it contains at least one pigment and at least one compound of the general formula I where $n=8-18$, preferably $n=10-18$, more preferably $n=14-18$, most preferably $n=14-16$, $p=1-4$, preferably $p=2$, and $m=15-25$, preferably $m=18-23$ and more preferably $m=20-23$.

The pigments used can be carbon blacks or colour pigments.

Useful colour pigments include for example yellow pigments, orange pigments, red pigments, magenta pigments, violet pigments, blue pigments, cyan pigments, green pigments or brown pigments. Colour pigments used may preferably be inorganic blue pigments, for example iron blue, ultramarine blue, cobalt blue or mixed phase blue pigments, or organic blue pigments, for example phthalocyanine blue or indanthrone blue.

As carbon black there may be used furnace, gas, flame, acetylene blacks, silicon-containing blacks, known from WO 98/45361 or DE 19613796, inversion blacks, known from DE 19521565, and metal-containing blacks, known from WO 98/42778. The carbon black used may preferably be pigment blacks having an average primary particle diameter of 8 to 80 nm, preferably 10 to 35 nm, and a DBP number of 40 to 200 ml/100 g, preferably 60 to 150 ml/100 g.

The gas black may have an average primary particle diameter of 8 to 30 nm, preferably 10 to 25 nm. The gas blacks may have a pH of 2 to 5, preferably 3.5 to 4.5.

The compound of the general formula I may preferably be $CH_3-(CH_2)_n-CH_2-O-[(CH_2)_2-O]_m-H$, where $n=10$, 12, 14, 16 and $m=18-23$.

Compounds of the general formula I may be for example $CH_3-(CH_2)_{10}-CH_2-O-[(CH_2)_2-O]_{18}-H$, $CH_3-(CH_2)_{12}-CH_2-O-[(CH_2)_2-O]_{18}-H$, $CH_3-(CH_2)_{14}-CH_2-O-[(CH_2)_2-O]_{18}-H$, $CH_3-(CH_2)_{16}-CH_2-O-[(CH_2)_2-O]_{18}-H$, $CH_3-(CH_2)_{10}-CH_2-O-[(CH_2)_2-O]_{20}-H$, $CH_3-(CH_2)_{12}-CH_2-O-[(CH_2)_2-O]_{20}-H$, $CH_3-(CH_2)_{14}-CH_2-O-[(CH_2)_2-O]_{20}-H$, $CH_3-(CH_2)_{16}-CH_2-O-[(CH_2)_2-O]_{20}-H$, $CH_3-(CH_2)_{10}-CH_2-O-[(CH_2)_2-O]_{23}-H$, $CH_3-(CH_2)_{12}-CH_2-O-[(CH_2)_2-O]_{23}-H$, $CH_3-(CH_2)_{14}-CH_2-O-[(CH_2)_2-O]_{23}-H$, or $CH_3-(CH_2)_{16}-CH_2-O-[(CH_2)_2-O]_{23}-H$.

The pigment preparation may contain a biocide, pH regulator, humidifier, bonding agent, defoamer.

The pigment preparation may contain a precipitated and/or fumed silica.

The pigment preparation may contain a dispersant. The dispersant may be a nonionic, a cationic, an anionic or an amphoteric wetting agent. The pigment preparation according to the invention, apart from the compound of the general formula I, may also be dispersant free.

The pigment preparation may consist of at least one pigment, at least one compound of the general formula I where $n=8-18$, preferably $n=10-18$, more preferably $n=14-18$, most preferably $n=14-16$, $p=1-4$, preferably $p=2$, and $m=15-25$, preferably $m=18-23$ and more preferably $m=20-23$,
a pH regulator, optionally a humidifier, optionally a bonding agent, optionally a defoamer and optionally a biocide.

The pigment preparation may have an average particle size of 5 to 5000 μm, preferably 10 to 1000 μm and more preferably 50 to 500 μm.

The pigment preparation may have a residual moisture content in the range from 0.1% to 20% by weight and preferably in the range from 11% to 20% by weight.

The pigment preparation may contain 50% to 99% by weight and preferably 60% to 90% by weight of pigment and 1% to 50% by weight and preferably 10% to 40% by weight of compound of the formula I.

In a particularly preferred embodiment of the invention, the pigment preparation may consist of at least one pigment selected from the group consisting of gas black, Pigment Yellow 74, Pigment Blue 15:3 and Pigment Red 122, at least one compound of the general formula I where $n=8-18$, preferably $n=10-18$, more preferably $n=14-18$, most preferably $n=14-16$, $p=1-4$, preferably $p=2$, and $m=15-25$, preferably $m=18-23$ and more preferably $m=20-23$,
a pH regulator, optionally a humidifier, optionally a bonding agent, optionally a defoamer and optionally a biocide.

The invention further provides a pigment preparation which is characterized in that it has a solids difference of less than 0.1% by weight, preferably less than 0.09% by weight and more preferably less than 0.06% by weight, before and after storage for a stirring time of 2 hours and a storage time of 24 hours.

The solids difference before and after storage is determined by adding 5 g of granules in a tall 150 mL glass beaker into 95 g of completely ion-free water and raising the pH to 8-9 by means of AMP 90. A triangular magnetic stirrer 3 cm in length is used to stir on a RETbasic from IKA magnetic stirring plate at 900 rpm for 2 hours. The samples are subsequently transferred into 100 mL mixing cylinders and a 3 mL PP pipette is used to draw a 2.5 mL sample at the 90 mL mark. The solids content of this sample is measured by means of Sartorius MA 100:

Measuring Parameters:
temperature: 130° C.
original weight: 2-4 g
switch-off condition: mass loss of 1 mg per 50 sec.

After 24 hours, a 2.5 mL sample is drawn, again at the 90 mL mark, and its solids content again determined.

The invention further provides a process for producing the pigment preparation, the process being characterized in that at least one pigment and at least one compound of the general formula I are dispersed in at least one solvent and subsequently dried.

Useful solvents include water, glycol, glycerol, alcohols or mixtures thereof.

Drying may be effected by freeze or spray drying or some other granulating process, for example fluidized bed granulation or moving bed drying.

Useful dispersing apparatus for producing the pigment preparation includes bead mills, ultrasound, Dispax, dissolvers, shaking mixers, for example Scandex, rotor-stator dispersing assembly, for example Ultra-Turrax, or Homogenisator.

Freezing and drying can take place in an ice condenser chamber. The freezing rate can be between 0.01 to 10° C./min, preferably between 0.1 to 3.0° C./min.

Drying can be effected using a spray dryer with nozzle atomization and cocurrent, half countercurrent (fountain atomization) and countercurrent gas routing. Useful spray nozzles include one-material spray nozzles, two-material spray nozzles or multi-channel spray nozzles.

Nozzle admission pressure can be 1-20 bar, preferably 10-20 bar. Inlet temperature can be 150-220° C., preferably 160-200° C.

The pigment preparation according to the invention can be used for coloration and/or antistaticization in waterborne colour and varnish systems, emulsion paints, printing inks, liquid-ink systems and coating systems.

The invention further provides a liquid ink containing at least one pigment preparation according to the invention.

The pigment preparations according to the invention advantageously have superior stir-in dispersibility to existing pigment preparations.

EXAMPLES

Example 1

Sedimentation Properties

The compositions of the aqueous carbon black dispersions are shown in Table 1.

TABLE 1

| Ingredients [% by weight] | Reference dispersion | | | | Pigment dispersion | | |
|---|---|---|---|---|---|---|---|
| | 1 | 2 | 3 | 4 | 1 | 2 | 3 |
| NIPex 160 IQ | 15.0 | 15.0 | 15.0 | 15.0 | 15.0 | 15.0 | 15.0 |
| Alkanol S 2 | 7.0 | | | | | | |
| Alkanol S 20 | | | | | 7.0 | | |
| Alkanol S 60 | | 7.0 | | | | | |
| Alkanol S 100 | | | 7.0 | | | | |
| Alkanol L 23P | | | | | | 7.0 | |
| Brij 58 | | | | | | | 7.0 |
| Brij 98 | | | | 7.0 | | | |
| AMP 90 | 0.2 | 0.2 | 0.2 | 0.2 | 0.2 | 0.2 | 0.2 |
| water | 77.8 | 77.8 | 77.8 | 77.8 | 77.8 | 77.8 | 77.8 |

Alkanol S 2 is a compound of the general formula 1 where $p=2$, $m=2$ and $n=16$ from Tego (a fatty alcohol ethoxylate).

Alkanol S 20 is a compound of the general formula 1 where $p=2$, $m=20$ and $n=16$ from Tego (a fatty alcohol ethoxylate).

Alkanol S 60 is a compound of the general formula 1 where $p=2$, $m=60$ and $n=16$ from Tego (a fatty alcohol ethoxylate).

Alkanol S 100 is a compound of the general formula 1 where $p=2$, $m=100$ and $n=16$ from Tego (a fatty alcohol ethoxylate).

Alkanol L 23P is a compound of the general formula 1 where $p=2$, $m=23$ and $n=10$ from Tego (a fatty alcohol ethoxylate).

Brij 58 is a compound of the general formula 1 where $p=2$, $m=16$ and $n=20$ from Aldrich (a fatty alcohol ethoxylate).

Brij 98 is a compound of the formula $CH_3-(CH_2)_7-CH=CH-(CH_2)_7-CH_2-O-[(CH_2)_2-O]_{20}-H$ from Aldrich (a fatty alcohol ethoxylate).

NIPex 160 IQ pigment grade carbon black is a gas black having an average primary particle size of 20 nm from Degussa GmbH.

AMP 90 is a 2-amino-2-methylpropanol from Angus Chemie.

1. Preparation of Wetting Agent Solution
    Charge water and dissolve compound of the general formula 1 or Brij 98 by heating to not more than 60° C.; after cooling, set an alkaline pH with AMP 90.
2. Incorporating the Carbon Black
    Incorporate NIPex 160 IQ pigment grade carbon black into prepared wetting agent solution a little at a time by slow stirring (either by hand or using a slow stirrer).
3. Dispersing
    The dispersion prepared in point 2 is dispersed with a bead mill.
    Pigment dispersions 1-3 and also reference dispersions 2-4 disperse to thin, liquid, homogeneous dispersions. Reference dispersion 1 cannot be made because of the poor solubility of Alkanol S 2 in water.
4. Spray Drying
    The dispersions are subsequently spray dried (Büchi 190 Mini Spray Dryer). The dispersion is peristaltically pumped to the spray nozzle and dried at an inlet temperature of 160° C. Separation is via a cyclone. The pigment preparations recited in Table 2 result therefrom.

TABLE 2

| Ingredients [% by weight] | Reference preparation | | | | Inventive pigment preparation | | |
|---|---|---|---|---|---|---|---|
| | 1 | 2 | 3 | 4 | 1 | 2 | 3 |
| NIPex 160 IQ | — | 66.8 | 66.6 | 66.8 | 67.0 | 66.6 | 66.9 |
| Alkanol S 2 | — | | | | | | |

TABLE 2-continued

| Ingredients | Reference preparation | | | | Inventive pigment preparation | | |
|---|---|---|---|---|---|---|---|
| [% by weight] | 1 | 2 | 3 | 4 | 1 | 2 | 3 |
| Alkanol S 20 | — | | | | 31.2 | | |
| Alkanol S 60 | — | 31.2 | | | | | |
| Alkanol S 100 | — | | 31.1 | | | | |
| Alkanol L 23P | — | | | | | 31.3 | |
| Brij 58 | — | | | | | | 31.4 |
| Brij 98 | — | | | 31.3 | | | |
| residual moisture | — | 2.0 | 2.3 | 1.9 | 1.8 | 2.1 | 1.7 |

Reference preparation 5 is XFast Schwarz ED 7484 from BASF, a low-dust, free-flowing, stir-in granular product which can be stirred directly into aqueous varnish formulations and contains Pigment Black 7.

The residual moisture content of the pigment preparations is determined on a sample by means of an MA 100 infrared dryer from Satorius.
Measuring Parameters:
temperature: 130° C.
sample weight: 2-4 g
switch-off condition: mass loss of 1 mg per 50 sec.

The particle size of the pigment preparation is determined on a 250 mL sample using a Camsizer from Retsch and the following measuring parameters:
particle model: spheres
image rate: 1:1
chute: 75 mm
Sedimentation Profile:
To investigate the sedimentation behaviour of the spray-dried products, 5 g of granules of each are introduced into 95 g of completely ion-free water in a 150 mL tall glass beaker and the pH is raised to 8-9 by means of AMP 90. A triangular magnetic stirrer 3 cm in length is used for stirring on a RETbasic magnetic stirrer plate from IKA for 3 hours.

Subsequently, 1 g of the dispersion obtained is diluted with 19 g of completely ion-free water and a sedimentation profile is recorded by means of a Lumifuge 116 Stability Analyser from L.U.M. GmbH, by measuring the transition of the sample as a function of time and place in a measuring cuvette under centrifugation.
Measuring Parameters:
1. 10 measurement profiles of 30 sec each, n=2000 rpm, light factor 3
2. 200 measuring profiles of 120 sec each, n=2000 rpm, light factor 3

The lower the slope of the cumulative transmission curve, the lower the sedimentation rate, the better the stability of the dispersion and hence the better the dispersibility of the pigment preparation.

Figure 1:
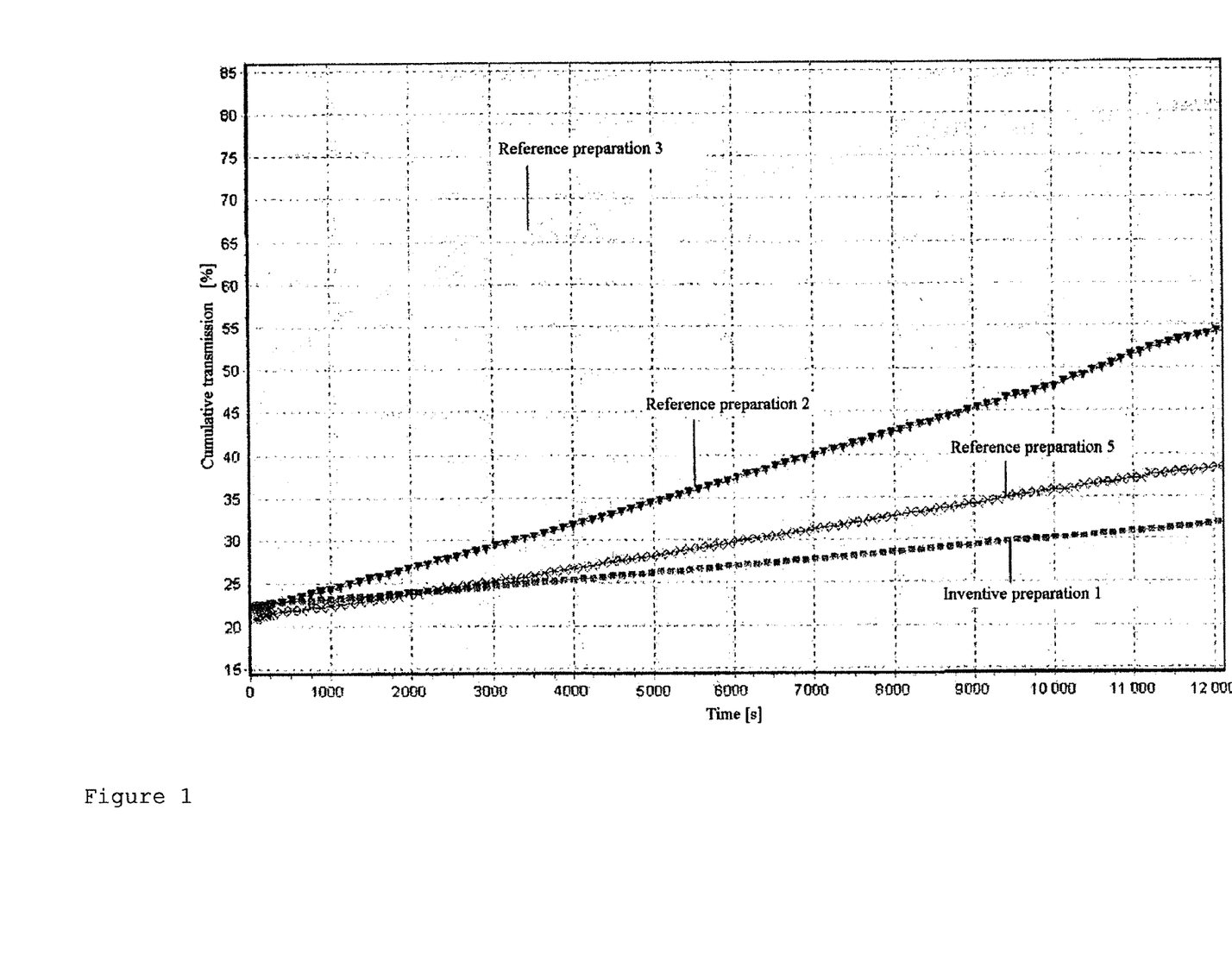
FIG. 1 shows the measured sedimentation profile of Inventive preparation 1 compared to Reference preparations 2, 3 and 5.
Figure 2:
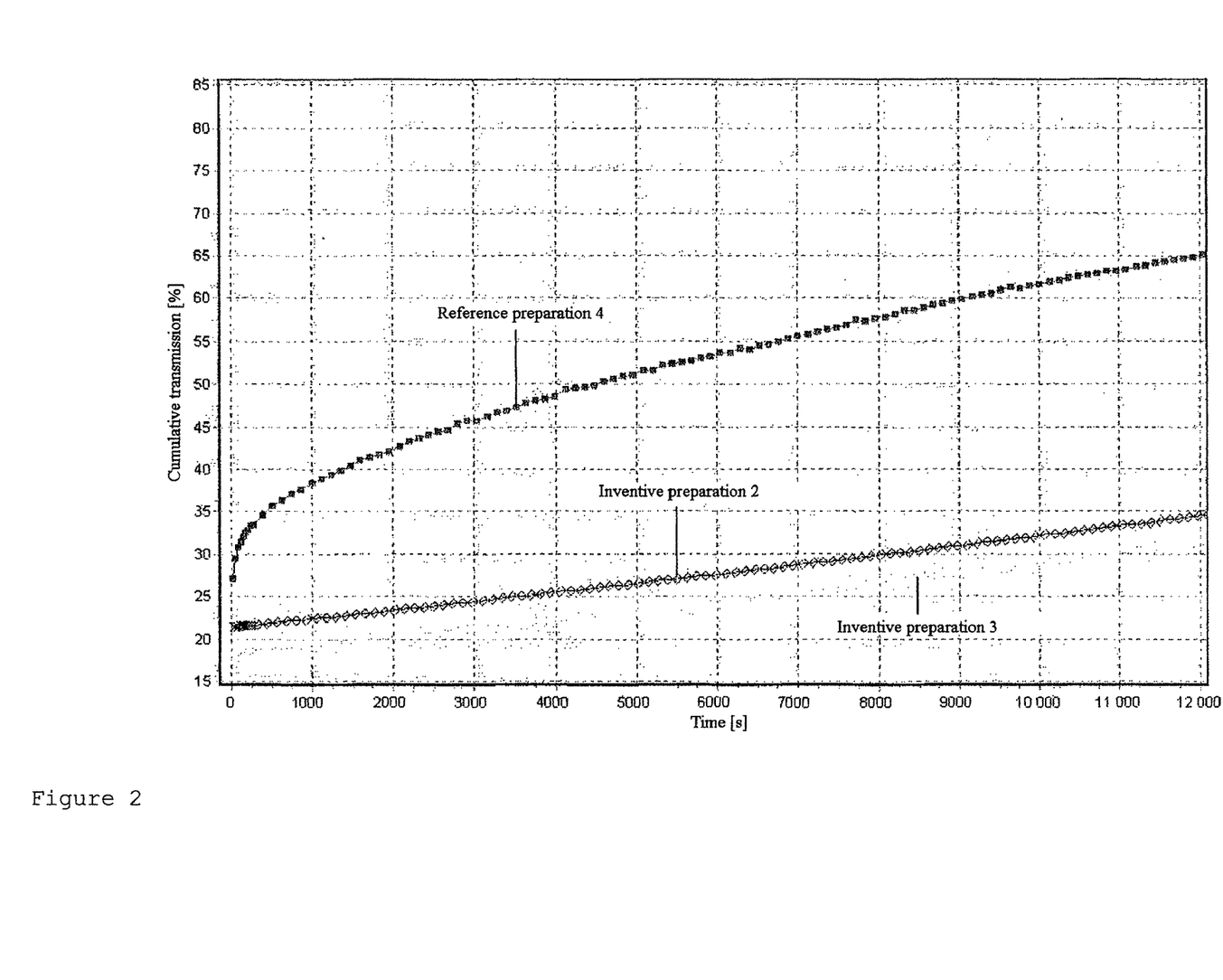
FIG. 2 shows the measured sedimentation profile of Inventive preparations 2 and 3 compared to Reference preparation 4.

The measured sedimentation profiles are shown in FIGS. 1 and 2.

The inventive pigment preparations 1-3 exhibit a distinctly lower sedimentation rate than the reference preparations 2-5. These results document a distinctly superior dispersibility for the inventive pigment preparations 1-3.

Example 2

Time Dependence of the Dispersibility

To investigate the time dependence of the dispersibility of the spray-dried pigment preparation, 5 g of inventive pigment preparation 1 are introduced into 95 g of completely ion-free water, the pH is adjusted to 8 to 9 with AMP 90 and a triangular magnetic stirrer is used for stirring for 0.5, 1, 2 and 3 hours on a RETbasic magnetic stirrer plate from IKA.

Subsequently, 1 g of the suspension obtained is diluted with 19 g of completely ion-free water and a sedimentation profile is recorded by means of a Lumifuge 116 Stability Analyser from L.U.M. GmbH.
Measuring Parameters:
1. 10 measurement profiles of 30 sec each, n=2000 rpm, light factor 3
2. 200 measuring profiles of 120 sec each, n=2000 rpm, light factor 3

Figure 3:
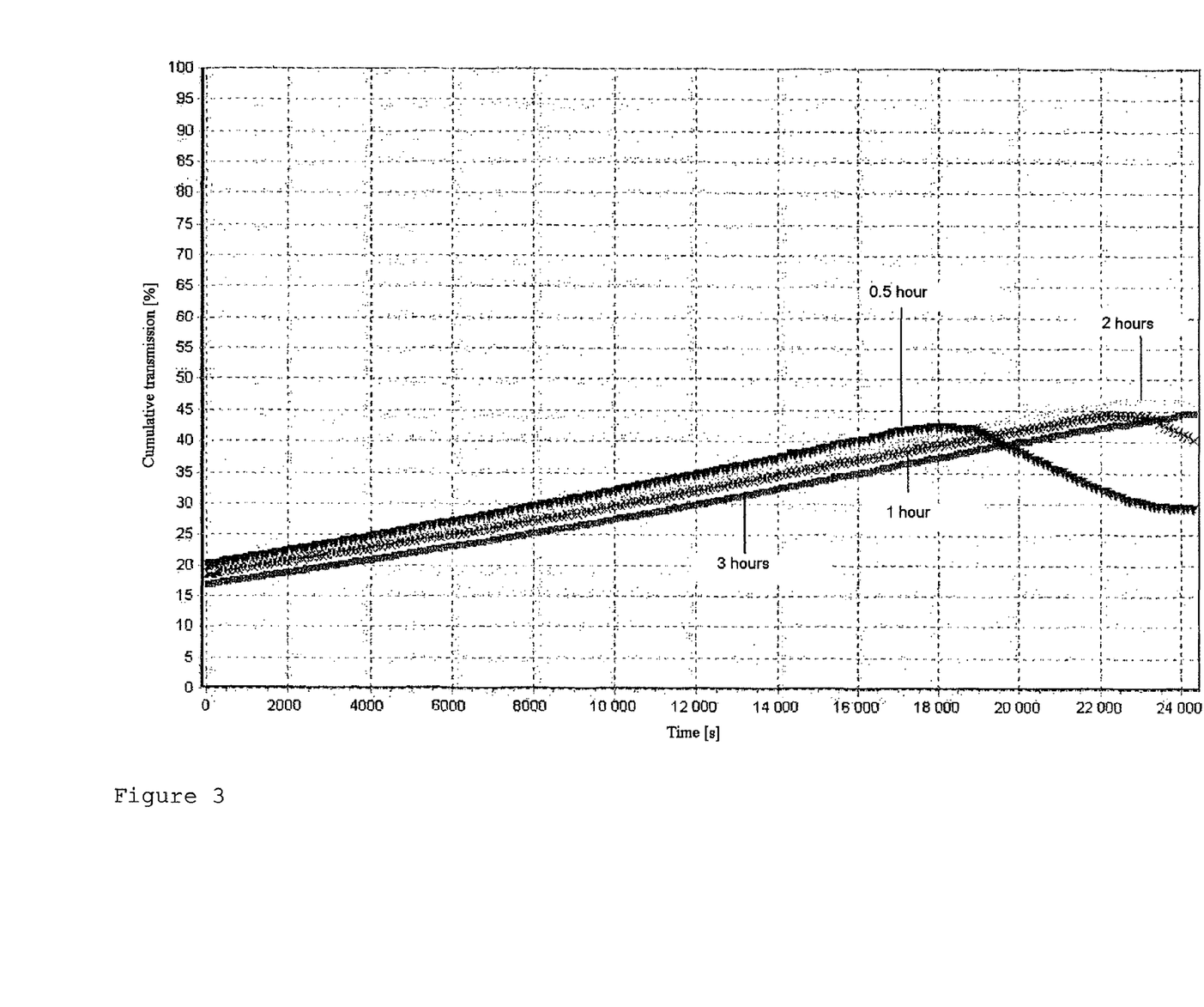
FIGS. 3 and 4 show the time dependence of the dispersibility of the pigment preparations.

The results are shown in FIG. 3.

Inventive pigment preparation 1 shows no collapse in transmission after 3 hours; after 3 hours of stirring with the magnetic stirrer the suspension can be deemed stable.

Reference preparation 5 is measured in the same way for comparison. 5 g of reference preparation 5 are introduced into 95 g of completely ion-free water, the pH is raised to 8 to 9 with AMP 90 and a magnetic stirrer is used to stir for 0.5, 1, 2 and 3 hours.

Subsequently, 1 g of the suspension obtained is diluted with 19 g of completely ion-free water and a sedimentation profile is recorded by means of a Lumifuge 116 Stability Analyser from L.U.M. GmbH.
Measuring Parameters:
1. 10 measurement profiles of 30 sec each, n=2000 rpm, light factor 3
2. 200 measuring profiles of 120 sec each, n=2000 rpm, light factor 3.

Figure 4:
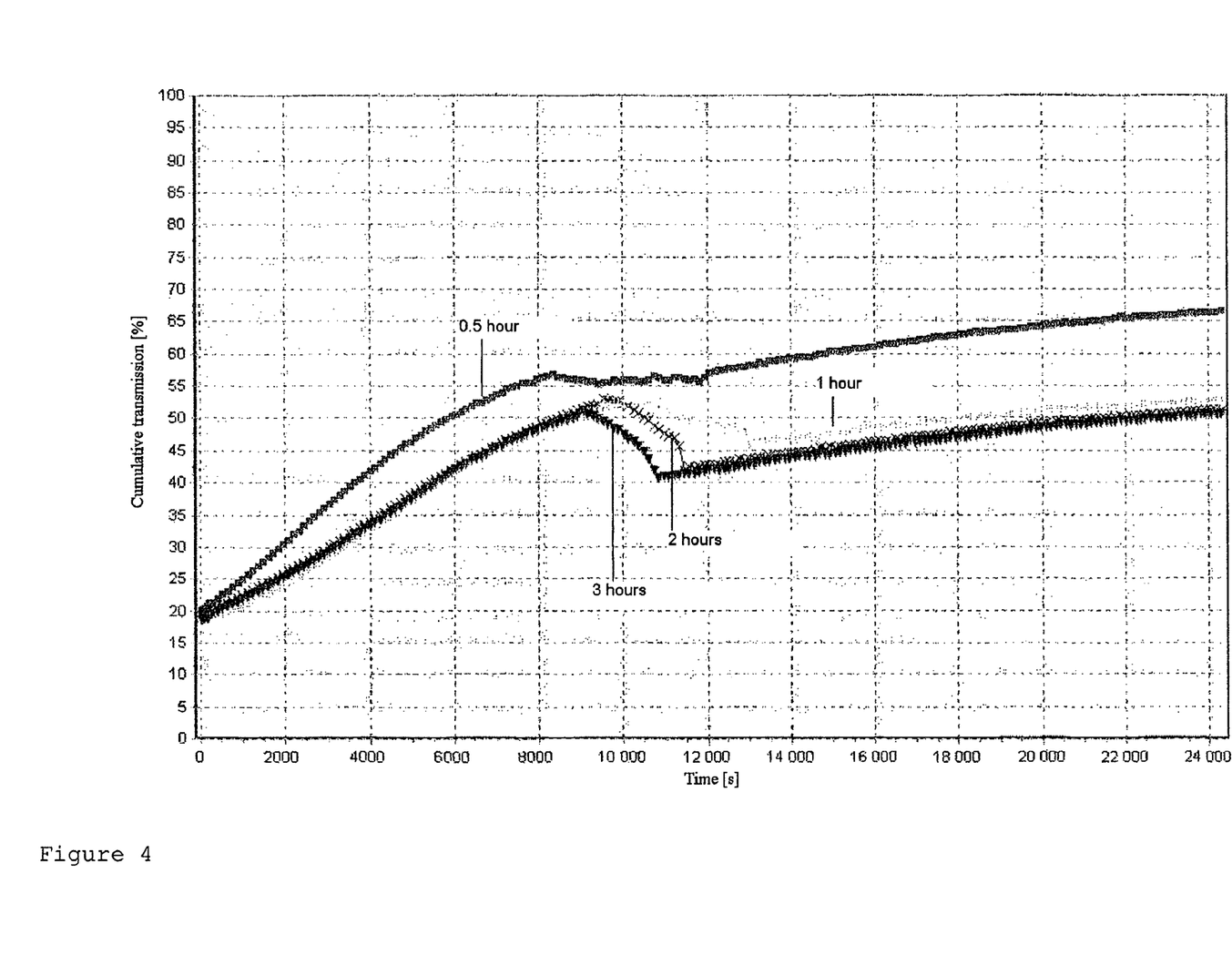

The results are shown in FIG. 4.

Even after 3 hours of stirring, reference preparation 5 did not give a stable suspension.

Example 3

Printing Tests of Pigmented Inks

In the examples which follow, inks for inkjet printers are produced on the basis of inventive pigment preparations and used for printing tests.
1. Preparation of Wetting Agent Solution
   Charge water and dissolve alkanol S 20 by heating to not more than 60° C.; after cooling AMP 90 is used to set an alkaline pH.
2. Incorporating the Pigment
   Incorporate pigment into prepared wetting agent solution a little at a time by slow stirring (either by hand or using a slow stirrer).
3. Dispersing
   The pigment dispersion prepared in point 2 is dispersed with a bead mill.
   The compositions of the aqueous pigment dispersions are shown in Table 3.

TABLE 3

| | Pigment dispersion | | |
|---|---|---|---|
| Ingredients [% by weight] | 4 | 5 | 6 |
| Pigment Yellow 74 | 15.0 | — | — |
| Pigment Blue 15:3 | — | 15.0 | — |
| Pigment Red 122 | — | — | 15.0 |
| Alkanol S20 | 7.0 | 7.0 | 7.0 |
| AMP 90 | 0.2 | 0.2 | 0.2 |
| water | 77.8 | 77.8 | 77.8 |

Pigment Red 122 is a magenta pigment from Sun under the trade name of Sunfast Red 122.

Pigment Blue 15:3 is a cyan pigment from Clariant under the trade name of Hostaperm Blau B2G.

Pigment Yellow 74 is a yellow pigment from Sun under the trade name of Sunbrite Yellow 74.

4. Spray Drying

The pigment dispersions are subsequently spray dried (Büchi 190 Mini Spray Dryer). The dispersion is peristaltically pumped to the spray nozzle and dried at an inlet temperature of 160° C. Separation is via a cyclone. The pigment preparations recited in Table 4 result therefrom.

TABLE 4

|  | Inventive pigment preparation | | |
|---|---|---|---|
| Ingredients [% by weight] | 4 | 5 | 6 |
| Pigment Yellow 74 | 67.0 | — | — |
| Pigment Blue 15:3 | — | 66.8 | — |
| Pigment Red 122 | — | — | 66.9 |
| Alkanol S 20 | 31.2 | 31.2 | 31.2 |
| water | 1.8 | 2.0 | 1.9 |

Reference preparation 6 is XFast Gelb ED 7574 from BASF, a low-dust, free-flowing, stir-in granular product which can be stirred directly into aqueous varnish formulations and contains Pigment Yellow 184.

Reference preparation 7 is XFast Magenta ED 7576 from BASF, a low-dust, free-flowing, stir-in granular product which can be stirred directly into aqueous varnish formulations and contains Pigment Red 122.

Reference preparation 8 is XFast Blau ED 7566 from BASF, a low-dust, free-flowing, stir-in granular product which can be stirred directly into aqueous varnish formulations and contains Pigment Blue 15:2.

To investigate the properties of the pigment preparations, 5 g of granules are stirred in a laboratory standard ink mixture for one hour with a blade stirrer. The degree of dispersion of the pigment preparations is subsequently assessed by optical microscopy.

Table 5 gives an overview of the inks produced.

TABLE 5

|  | Reference ink | | | Inventive ink | | |
|---|---|---|---|---|---|---|
| Ingredients [% by weight] | 1 | 2 | 3 | 1 | 2 | 3 |
| reference preparation 6 | 5.0 | — | — | — | — | — |
| reference preparation 7 | — | 5.0 | — | — | — | — |
| reference preparation 8 | — | — | 5.0 | — | — | — |
| inventive pigment preparation 4 | — | — | — | 5.0 | — | — |
| inventive pigment preparation 5 | — | — | — | — | 5.0 | — |
| inventive pigment preparation 6 | — | — | — | — | — | 5.0 |
| 2-pyrrolidone | 3.0 | 3.0 | 3.0 | 3.0 | 3.0 | 3.0 |
| glycerol | 10.0 | 10.0 | 10.0 | 10.0 | 10.0 | 10.0 |
| 1,2-hexanediol | 2.0 | 2.0 | 2.0 | 2.0 | 2.0 | 3.0 |
| triethylene glycol | 12.0 | 12.0 | 12.0 | 12.0 | 12.0 | 12.0 |
| Surfynol 465 | 1.2 | 1.2 | 1.2 | 1.2 | 1.2 | 1.0 |
| Acticide MBS | 0.3 | 0.3 | 0.3 | 0.3 | 0.3 | 0.3 |
| completely ion-free water | 66.5 | 66.5 | 66.5 | 66.5 | 66.5 | 65.7 |
| Assessment under optical microscope | 5 | 4 | 3 | 1 | 1 | 1 |

Figure 5:
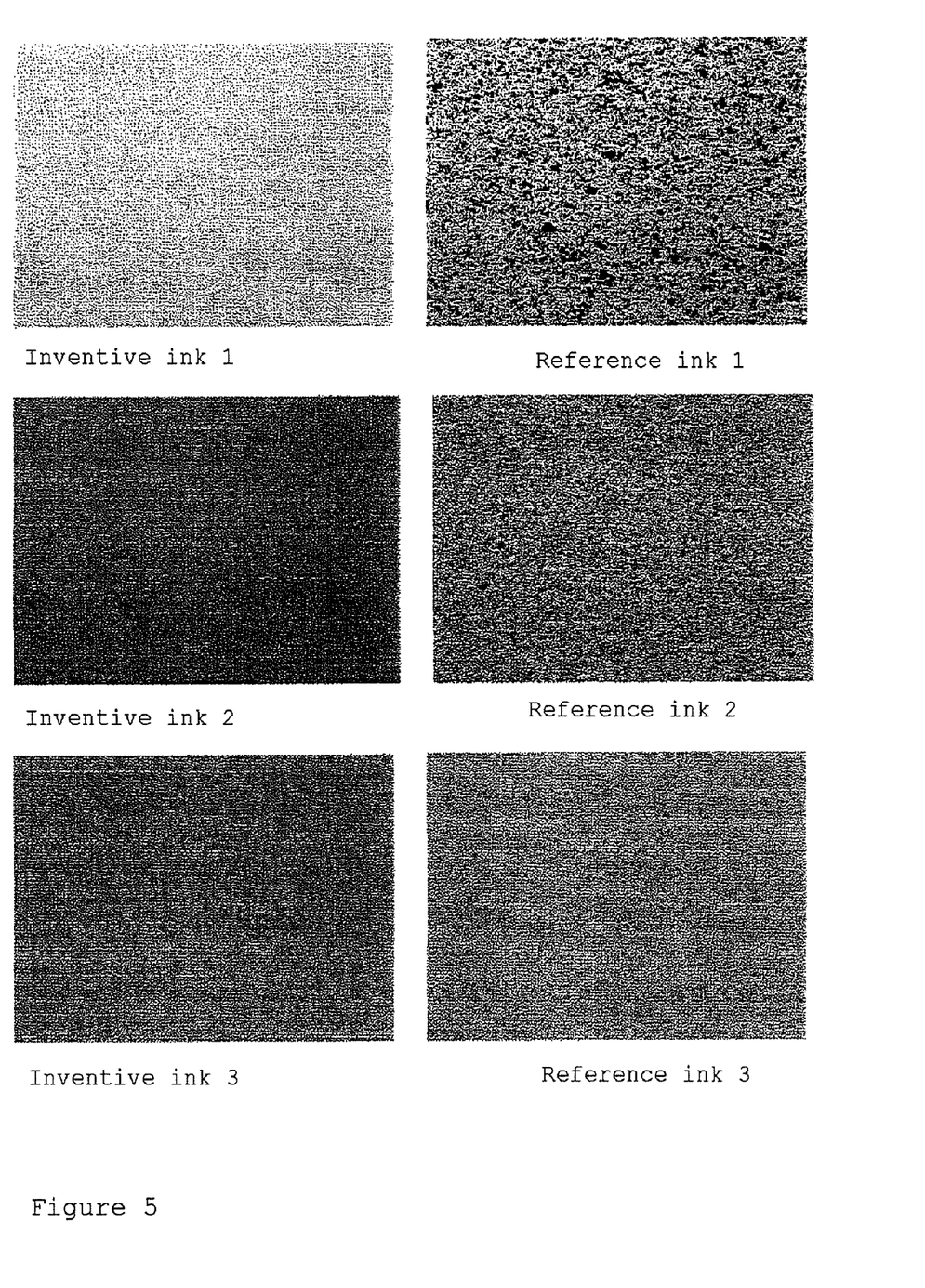
FIG. 5 shows the optical micrographs of the inks at 200 fold magnification.

Grading Scale for Assessment Under Optical Microscope:
1: no particles greater than 2 Ξm
2: few particles greater than 2 μm
3: many particles greater than 2 μm
4: many particles greater than 5 μm
5: many particles greater than 10 μm FIG. 5 shows the optical micrographs of the inks at 200 fold magnification.

Inventive inks 1, 2 and 3 exhibit distinctly superior stir-in behaviour to reference inks 1, 2 and 3.

On the basis of the assessment under the optical microscope, inventive inks 1 to 3 are printed up, while reference inks 1 to 3 cannot be printed owing to the poor dispersibility.

The inventive inks are filtered through a 500 nm depth filter and printed up using a JV4 wide-format printer from Mimaki. Since reference inks 1 to 3 cannot be printed owing to the poor dispersibility, original Mimaki inks are used as reference inks. Table 6 below summarizes the values found.

TABLE 6

|  | Reference ink | | | Inventive ink | | |
|---|---|---|---|---|---|---|
|  | 4 Mimaki (SPC-0180Y) | 5 Mimaki (SPC-0180C) | 6 Mimaki (SPC-0180M) | 1 | 2 | 3 |
| viscosity [mPas] | 3.07 | 3.22 | 3.07 | 3.01 | 3.1 | 3.32 |
| surface tension [mN/m] | 33.2 | 34.0 | 33.2 | 37.0 | 35.3 | 34.1 |
| pH | n.d | n.d. | n.d. | 8.45 | 7.2 | 6.6 |
| optical density (Star Photo Ultrawhite Matt 150 g/m², from emblem) | 1.14 | 0.85 | 1.20 | 1.27 | 1.12 | 1.27 |
| printability | 1 | 1 | 1 | 1 | 1 | 1 |
| 7 day refire test | 1 | 1 | 1 | 1 | 1 | 1 | n.d.: not determinable

Assessment Scale:
1: very good
5: poor

Determination of Viscosity:

The rheological behaviour is captured using a Physica UDS 200 rheometer in a rotation test at controlled rate of shear (CRS). The viscosity value is read off at shear rate of 1000 $S^{-1}$.

Determination of Surface Tension:

Dynamic surface tension is determined using a Krüss BP2 bubble tensiometer. The final value is read off at 3000 ms.

Determination of pH:

The pH is determined on the neat suspension using a Scott CG 837 pH meter. The glass electrode is dipped into the solution and the temperature-corrected pH is read off five minutes later.

Determination of Optical Density:

Optical density of the printing demonstrations is determined using a Spectroeye densitometer from GretagMcBeth.

Determination of Printability:

The printing tests were carried out with a Mimaki JV4 printer. The ink is filtered using a filter fineness of 500 nm and devolatilized under reduced pressure. The finished ink is filled into a cleaned original printer cartridge and printed up. The printing demonstrations are assessed by visual inspection for stripes (nozzle blockages), crispness and intercolour bleeding.

Determination of Refire Behaviour:

A refire test is used to assess the start-of-printing, or drying, behaviour of the inks after not printing for 1, 3 and 7 days, by visual inspection.

Inventive inks 1 to 3 have good printing properties and do not give rise to any blockages even after not printing for 7 days. Their optical density values are higher than with the reference inks from the printer manufacturer.

Example 4

Stir-in Dispersibility

The examples which follow focus more closely on the stir-in dispersibility of the preparations.
The Solids Difference Before and after Storage:

The properties of the spray-dried products are investigated by adding 5 g of granules in a tall 150 mL glass beaker into 95 g of completely ion-free water and raising the pH to 8-9 by means of AMP 90. A triangular magnetic stirrer 3 cm in length is used to stir on a RETbasic from IKA magnetic stirring plate at 900 rpm for 2 hours. The samples are subsequently transferred into 100 mL mixing cylinders and a 3 mL PP pipette is used to draw a 2.5 mL sample at the 90 mL mark. The solids content of this sample is measured by means of Satorius MA 100:
Measuring Parameters:
temperature: 130° C.
original weight: 2-4 g
switch-off condition: mass loss of 1 mg per 50 sec.

After 24 hours, a 2.5 mL sample is drawn, again at the 90 mL mark, and its solids content again determined.

Reference preparation 9 is XFast Gelb 1252 from BASF, a low-dust, free-flowing, stir-in granular product which can be stirred directly into aqueous varnish formulations and contains Pigment Yellow 74.

Reference preparation 10 is XFast Rot 3855 from BASF, a low-dust, free-flowing, stir-in granular product which can be stirred directly into aqueous varnish formulations and contains Pigment Red 112.

Reference preparation 11 is XFast Violett ED 7575 from BASF, a low-dust, free-flowing, stir-in granular product which can be stirred directly into aqueous varnish formulations and contains Pigment Violet 23.

TABLE 7

| Sample dispersion of | Solids after stirring (before storage) in % by weight | Solids after 24 h (after storage) in % by weight | Solids difference before and after storage in % by weight |
|---|---|---|---|
| inventive pigment preparation 1 | 4.82 | 4.78 | 0.04 |
| inventive pigment preparation 4 | 4.78 | 4.77 | 0.01 |
| inventive pigment preparation 5 | 5.01 | 4.93 | 0.08 |
| inventive pigment preparation 6 | 4.91 | 4.84 | 0.07 |
| reference preparation 2 | 4.84 | 0.99 | 3.85 |
| reference preparation 3 | 4.89 | 0.79 | 4.10 |
| reference preparation 5 | 4.97 | 4.56 | 0.41 |
| reference preparation 6 | 4.96 | 0.82 | 4.14 |
| reference preparation 8 | 4.85 | 4.42 | 0.43 |
| reference preparation 9 | 4.98 | 3.37 | 1.61 |
| reference preparation 10 | 4.96 | 4.44 | 0.52 |
| reference preparation 11 | 4.99 | 4.34 | 0.65 |

The inventive pigment preparations display a distinctly smaller solids difference before and after the storage than the reference preparations and thus have superior stir-in dispersibility (Table 7).

The invention claimed is:

1. A pigment preparation which comprises at least one pigment and at least one compound selected from the group consisting of $CH_3—(CH_2)_{10}—CH_2—O—[(CH_2)_2—O]_{18}—H$, $CH_3—(CH_2)_{12}—CH_2—O—[(CH_2)_2—O]_{18}—H$, $CH_3—(CH_2)_{14}—CH_2—O—[(CH_2)_2—O]_{18}—H$, $CH_3—(CH_2)_{16}—CH_2—O—[(CH_2)_2—O]_{18}—H$, $CH_3—(CH_2)_{10}—CH_2—O—[(CH_2)_2—O]_{20}—H$, $CH_3—(CH_2)_{12}—CH_2—O—[(CH_2)_2—O]_{20}—H$, $CH_3—(CH_2)_{14}—CH_2—O—[(CH_2)_2—O]_{20}—H$, $CH_3—(CH_2)_{16}—CH_2—O—[(CH_2)_2—O]_{20}—H$, $CH_3—(CH_2)_{10}—CH_2—O—[(CH_2)_2—O]_{23}—H$, $CH_3—(CH_2)_{12}—CH_2—O—[(CH_2)_2—O]_{23}—H$, $CH_3—(CH_2)_{14}—CH_2—O—[(CH_2)_2—O]_{23}—H$ and $CH_3—(CH_2)_{16}—CH_2—O—[(CH_2)_2—O]_{23}—H$.

2. The pigment preparation according to claim 1, wherein the pigment is a
colour pigment or a carbon black.

3. The pigment preparation according to claim 1, wherein the pigment is a gas black.

4. The pigment preparation according to claim 1, wherein the residual moisture content is in the range from 0.1% to 20% by weight.

5. The pigment preparation according to claim 1, wherein it has a solids difference of less than 0.1% by weight before and after storage for a stirring time of 2 hours and a storage time of 24 hours.

6. A process for producing the pigment preparation according to claim 1, wherein the at least one pigment and the at least one compound are dispersed in at least one solvent and subsequently dried.

7. A process for producing the pigment preparation according to claim 6, wherein the pigment preparation is spray dried or freeze dried.

8. A method of coloration and/or antistaticization in waterborne colour and varnish systems, emulsion paints, printing inks, liquid-ink systems and coating systems which comprises adding the pigment preparation according to claim 1 thereto.

9. A liquid ink which comprises at least one pigment preparation according to claim 1.

\* \* \* \* \*